Sept. 19, 1961 S. DUINKER 3,001,122
FREQUENCY TRANSFORMATION DEVICE
Filed Feb. 13, 1957 2 Sheets-Sheet 1

INVENTOR
SIMON DUINKER
BY Frank R. Trifari
AGENT

United States Patent Office 3,001,122
Patented Sept. 19, 1961

3,001,122
FREQUENCY TRANSFORMATION DEVICE
Simon Duinker, Eindhoven, Netherlands, assignor to North American Philips Company, Inc., Irvington on Hudson, N.Y.
Filed Feb. 13, 1957, Ser. No. 639,952
Claims priority, application Netherlands Mar. 13, 1956
14 Claims. (Cl. 321—69)

This invention relates to devices for stepping down the frequency of the voltage produced by a generator.

It is known that, if an alternating-current generator is connected to a circuit including at least one non-linear element, the current flowing through the non-linear element is distorted and under certain conditions harmonics or subharmonics of the supply current are produced. Frequency transformation devices utilizing this phenomenon have been known for some time and in most cases comprise an inductance having a core of ferromagnetic material which is used as the non-linear element. By means of a suitable circuit, it is comparatively easy in this way to produce higher harmonics. Without much trouble and with comparatively great reliability it is also possible to produce even subharmonics, for example by the use of two input windings which are connected to the generator and by means of which magnetic fields of opposite directions are produced in different parts of the ferromagnetic core, while an output winding is so arranged that a voltage related to the difference between said fields is produced therein. For the same purpose, use has also been made of other asymmetries, for example direct-current pre-magnetization of the ferromagnetic core. Odd subharmonics are usually produced by means of switching-on shocks, which usually involves great difficulties, since the occurrence or non-occurrence of the desired subharmonic is dependent on both the phase of the switching on of the generator with respect to the passage through zero of the generator current or voltage and on the value of this current or voltage. Efforts have been made to avoid this difficulty by including in the generator circuit a kind of automatic starter, which switches the generator on and off till the desired subharmonic voltage is obtained in the output circuit. However, this implies that one cannot be sure to obtain the desired subharmonic at the desired moment. Furthermore, such an automatic starter together with its control device is comparatively expensive and complicated, so that this solution is avoided, if possible. With the aid of known frequency transformation devices of the above-mentioned type, it has furthermore been found in most cases that the subharmonics produced disappear as soon as any appreciable load is connected to the output circuit, the load exerting a certain reaction on the input circuit. This circumstance makes it almost impossible for considerable energy of a determined subharmonic frequency to be derived directly from such a device.

The object of the invention is to provide a frequency transformation device which will obviate the last-mentioned disadvantage and thus also to create conditions which are favourable for the generation of subharmonics.

The device according to the invention is characterized in that an inductance comprising a core of ferromagnetic material having a comparatively narrow air-gap is included in said input circuit and that a plate of a material exhibiting unidirectional magneto-electric transmission properties is arranged in said air-gap, so that a variation in the magnetic field through the plate produces a corresponding voltage variation between two electrodes arranged on opposite sides of the plate and coupled to the output terminals of the device, the magnetic field through the air-gap being independent of any load connected in the output circuit.

In order that the invention may be readily carried into effect, several embodiments will now be described more fully, by way of example, with reference to the accompanying drawings, in which FIG. 1 shows one embodiment of the device according to the invention.

Figure 1:
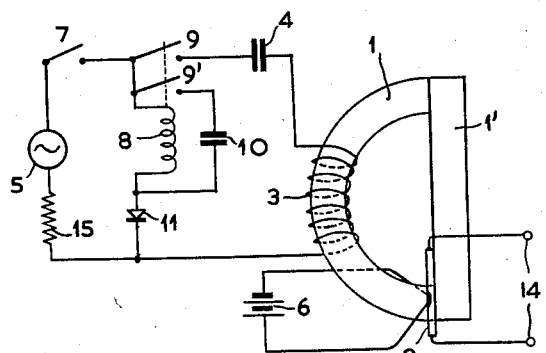
Figure 2:
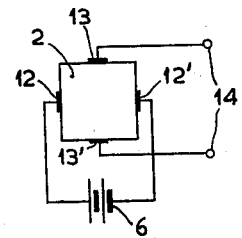
FIG. 2 shows an energizing circuit and the output circuit of the field-sensitive plate of the embodiment of FIG. 1.

The embodiment shown in FIG. 1 comprises a core 1, 1' of ferromagnetic material, preferably of a material having a rectangular hysteresis loop, for example ferrite. The said core consists of two parts 1 and 1', so that a plate 2 of a material exhibiting unidirectional magneto-electric transmission properties may readily be arranged between the two parts 1 and 1'. The part 1 of the ferromagnetic core has the shape of a half ring, one extremity of which has been ground off through a length equal to the thickness of the plate 2, and carries a winding 3 connected through a capacitor 4 to a voltage generator 5. The plate 2 is thus arranged in an airgap of the core 1, 1', so that the magnetic flux of this core passes through the plate 2. As may clearly be seen from FIG. 2, two pairs of electrodes 12, 12' and 13, 13', respectively, are arranged on the sides of the plate 2. A direct current source 6 is connected between the electrodes 12 and 12', the electrodes 13 and 13' being connected to output terminals 14. The device also comprises a switch 7 and a relay 8 having two make contacts 9 and 9'. A capacitor 10 is connected by way of make contact 9' parallel to the relay winding 8, which is connected via switch 7 and a rectifier 11 to the generator 5. The input circuit of the device also includes a resistor 15, which is at least partly constituted by the comparatively low inner resistance of the voltage generator 5.

The generator 5 provides an alternating voltage of a given frequency $p$. When the switch 7 and the make contact 9 are closed, an alternating current flows via capacitor 4 through the winding 3 and through resistor 15. The ferromagnetic core 1, 1' is thus magnetized in such manner that the permeability of the ferromagnetic material from which it is made varies greatly with the instantaneous value of the alternating voltage applied to the winding 3. The winding 3 together with the ferromagnetic core 1, 1' thus constitutes a non-linear inductance in the load circuit of generator 5. Due to the presence of this non-linear element, the current through the said load circuit is greatly distorted, so that with a suitable choice of the values of capacitor 4, resistor 15, the voltage of generator 5 and the non-linear inductance of the winding 3, the magnetic field through the core 1, 1' exhibits a strong component of a subharmonic frequency $p/n$, where $n$ is an integer and is the order of the subharmonic concerned. The plate 2 is subject to the action of the field through the magnetic core 1, 1'. The plate consists of a material having magneto-electric transmission properties effective in only one direction, such as a Hall-effect, for example of a crystal of germanium, silicon or of an indium-antimony alloy. It is known that, when such a material is disposed in a magnetic field and a current flows through the material substantially at right angles to the direction of the magnetic field, a voltage occurs substantially at right angles to the directions of the magnetic field and of the energizing current. This voltage is proportional to the magnetic field and to the energizing current and is also inversely proportional to the thickness of the plate and proportional to a so-called Hall-effect constant. Also of importance are the directions of the magnetic field and of the energizing current with respect to the axes of the crystal. A voltage is thus set up at the output terminals 14, which voltage is proportional to the magnetic field through the core 1, 1'.

Figure 3:
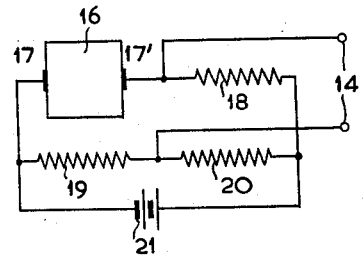
FIG. 3 shows a second embodiment, in which the field-sensitive plate is included in a bridge circuit.

FIG. 3 shows part of a second embodiment, in which a plate 16 exhibiting a magneto-resistance effect or Gauss effect in any occurring magnetic field, for example a plate of bismuth or an indium-antimony alloy, has been substituted for the Hall-effect plate 2. This Gauss effect becomes stronger when the temperature decreases, so that the winding 3 together with the core 1, 1' and the plate 16 are preferably arranged in a thermostat and maintained at a low temperature of, for example, 138° K. In a certain region, for example for values of the magnetic field higher than 10,000 Gauss, the resistance between two electrodes 17 and 17' arranged on opposite sides of the plate is a substantially linear function of the field strength, so that the core 1, 1' preferably consists of a material of higher permeability. The path between the electrodes 17 and 17' thus constitutes a variable resistance. This resistance is included with further resistors 18, 19 and 20 in an electric bridge circuit and is supplied across a diagonal thereof from a current source 21, whereas the output terminals 14 are connected to the two other diagonal points of the bridge. When the resistance of plate 16 varies, the balance of the bridge 16—20 is disturbed, so that a voltage occurs at the terminals 14. This voltage is in direct relationship to the magnetic field through the core 1, 1' and through the plate 16. The operation of this second embodiment is otherwise substantially identical with that of the first embodiment shown in FIGS. 1 and 2.

Figure 4:
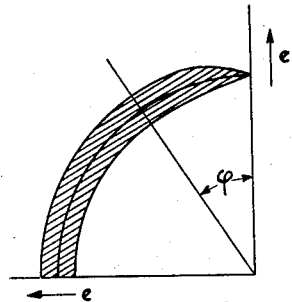
FIG. 4 is a polar diagram which serves to explain the operation of the embodiments shown in FIGS. 1, 2 and 3.

It has previously been pointed out that the magnetic field through the core 1, 1' may exhibit a strong component of a subharmonic frequency $p/n$. To achieve this, it is advantageous to give the capacitor 4 a value such that the minimum natural frequency of the series circuit constituted by capacitor 4 and the winding 3 together with the ferromagnetic core 1, 1' is at least 1.5 times lower than the generator frequency $p$ and preferably at most equal to the frequency of the desired subharmonic. For this minimum natural frequency, the inductance of the winding 3 is that which corresponds to the maximum slope of the hysteresis loop. The polar diagram of FIG. 4 shows, for example, a cross-hatched region in which the third subharmonic is produced with reliability. This region is limited by two values of the effective voltage $e$ at the terminals of generator 5 and was found for certain values of the maximum inductance of winding 3, of capacitor 4 and of resistor 15. It will be seen that the limiting values of $e$ for small values of the phase angle $\varphi$ between the switching-on of the generator and the passage through zero of the generator voltage approach one another, so that the cross-hatched region gradually becomes narrower for small angles and disappears when the phase angle $\varphi$ is equal to zero. The occurrence or non-occurrence of the third harmonic is thus dependent upon the moment when the generator is switched on. In order to eliminate this dependency, the generator is connected to the capacitor 4 via the make contact 9 of relay 8. When the switch 7 is closed, the relay 8 is energized with a small delay, so that its make contacts are closed at any rate after the passage through zero of the generator voltage. The make contact 9' then connects the capacitor 10 in parallel with the winding 8, so that the make contacts 9 and 9' remain closed, since the relay acquires a comparatively large time-constant after the contact 9' has been closed. Due to the fact that a rectifier 11 is connected in series with the winding 8 and the capacitor 10, the relay 8, 9, 9' may be of the direct current type. Its delay must, of course, be smaller than half a cycle of the voltage provided by the generator 5, so that the frequency $p$ is limited to several tens of cycles per second by the inertia of the relay. However, the starter constituted by the relay 8, 9, 9', the rectifier 11 and the capacitor 10 may be replaced by a similar electronic circuit in order that the occurrence of an odd subharmonic at the desired moment, that is to say substantially at the moment when the switch 7 is closed, may be achieved with security even at a comparatively high frequency $p$. In the absence of any appreciable load or variation in load, the subharmonic produced remains stable and the magnetic field through the core 1, 1' varies almost sinusoidally with the subharmonic frequency $p/n$. The plate 2 or 16 does not, however, constitute a load, so that a voltage proportional to this field may be derived from the output terminals 14. The described devices furthermore have the advantage that the amplitude of the subharmonic component of the output voltage is $n$ times greater than with direct observation of the voltage proportional to the flux variations, for example by means of an output winding.

Figure 5:
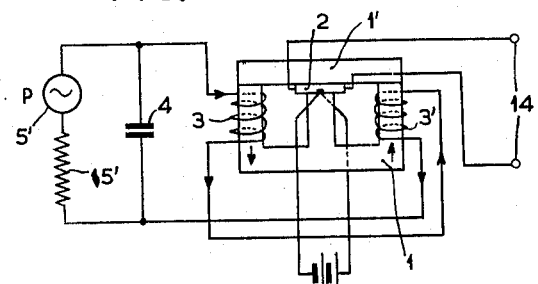
FIG. 5 shows a third embodiment.

FIG. 5 shows a third embodiment which is particularly suitable for producing even subharmonics. In accordance with this example, the device comprises a current generator 5' in series with a comparatively high-ohmic resistor 15', which is at least partly constituted by the internal resistance of the generator. The generator 5' supplies a current $i$ of a frequency $p$. A parallel circuit constituted by a capacitor 4 and two windings 3 and 3' is connected to its output terminals. Said windings are arranged on the two outer legs of a three-legged core 1, 1' constituted by an E-shaped main part 1, the centre leg of which is a little shorter than the two other ones, and a rod-shaped part 1'. They are connected in series in such manner that the current through said windings magnetize the two outer legs of the core in opposite directions. The fluxes through these two legs thus flow in opposite directions through the third leg of the core, so that this leg is magnetized in accordance with the difference between the two fluxes. The flux through this leg also flows through the narrow air-gap between its extremity and the part 1', in which a Hall-effect plate 2 is arranged. Substantially at right angles to the direction of the flux through the plate 2, an electric current is supplied to two electrodes 12 and 12' arranged on opposite sides of the plate. The current supplied by a source 6 thus flows through the plate 2 substantially at right angles to the magnetic field, resulting in a voltage between two electrodes 13 and 13' arranged on the two other sides of the plate, as shown for example in FIG. 2, and between the output terminals 14 which are connected thereto. The voltage thus produced is substantially proportional to the magnetic field through the centre limb of the core 1, 1' and is thus in direct relationship to the distorted magnetic field in the core 1, 1'. Under certain conditions, and more particularly for determined values of the maximum inductance of the windings 3 and 3' and of the capacity of capacitor 4, as well as for determined values of the current $i$ supplied by generator 5' and of the resistor 15', said distorted field exhibits a strong even subharmonic component of the frequency $p/2n$. In this case also, the minimum natural frequency of the circuit including the capacitor 4 and the windings 3 and 3' would preferably have to be at most equal to the frequency $p/2n$ of the desired subharmonic and at any rate at least 1.5 times smaller than the generator frequency $p$.

Figure 6:
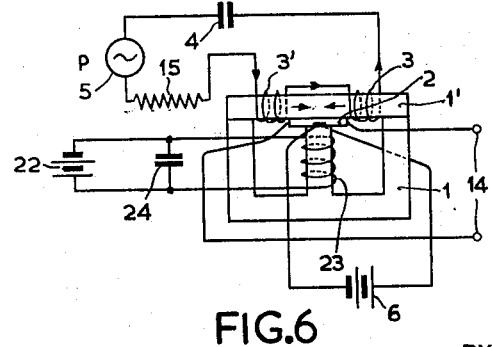
FIG. 6 shows a fourth embodiment.

The embodiment shown in FIG. 6 also comprises a voltage generator 5, which is connected in series with a resistor 15 and which supplies a voltage $e$ of a frequency $p$. Connected to the output terminals of the generator 5 is a series-circuit constituted by a capacitor 4 and two windings 3 and 3' connected in series. The device also comprises a three-legged core 1, 1', constituted by an E-shaped main part of ferrite having a somewhat shorter centre limb and a rod-shaped part 1' consisting of a ferromagnetic material of high permeability, on which the two windings 3 and 3' are arranged. A Hall-effect plate 2 is arranged in the narrow air-gap between the centre leg of the E-shaped main part 1 and the rod-shaped part 1'. The windings 3 and 3' are so connected that a current through these windings produces opposite fluxes in the rod-shaped part 1', so that the fluxes in the centre leg are summed up. The centre leg carries a third winding 23 which is connected in parallel with a capacitor 24 to a direct-current source 22 of sufficiently high impedance.

Due to the particular shape of the magnetization characteristics of the core 1, 1' in the region in which the operating-point is held by means of the voltage at the terminals of generator 5 and the premagnetizing current through the winding 23, the magnetic field through the centre leg of this core and through the Hall-effect plate 2 exhibits a considerable distortion, it being possible for this field to contain a strong component having a subharmonic frequency $p/n$ of very high rank. The occurrence of this subharmonic is enhanced by a suitable choice of capacitor 4, of the maximum inductances of windings 3 and 3', and of resistor 15. The subharmonic produced is still further amplified by means of a parallel resonant circuit which is coupled to the magnetic circuit of the core 1, 1' and which comprises the winding 23 and the capacitor 24, the effective natural frequency of said circuit being substantially equal to $p/n$, that is to say equal to the frequency of the desired subharmonic.

It must be pointed out that in all the embodiments described any load connected to the output terminals 14 cannot produce any reaction upon the input circuit of the device, so that the distortion of the magnetic field through the core 1, 1' is independent of such a load.

It will be evident that the voltage generator 5 of the embodiments of FIGS. 1, 2, 3 and 6 may be replaced by a current generator 5' similar to that shown in FIG. 5 and conversely provided that the voltage generator feeds a series-circuit, and the current generator feeds a parallel circuit.

Figure 7:
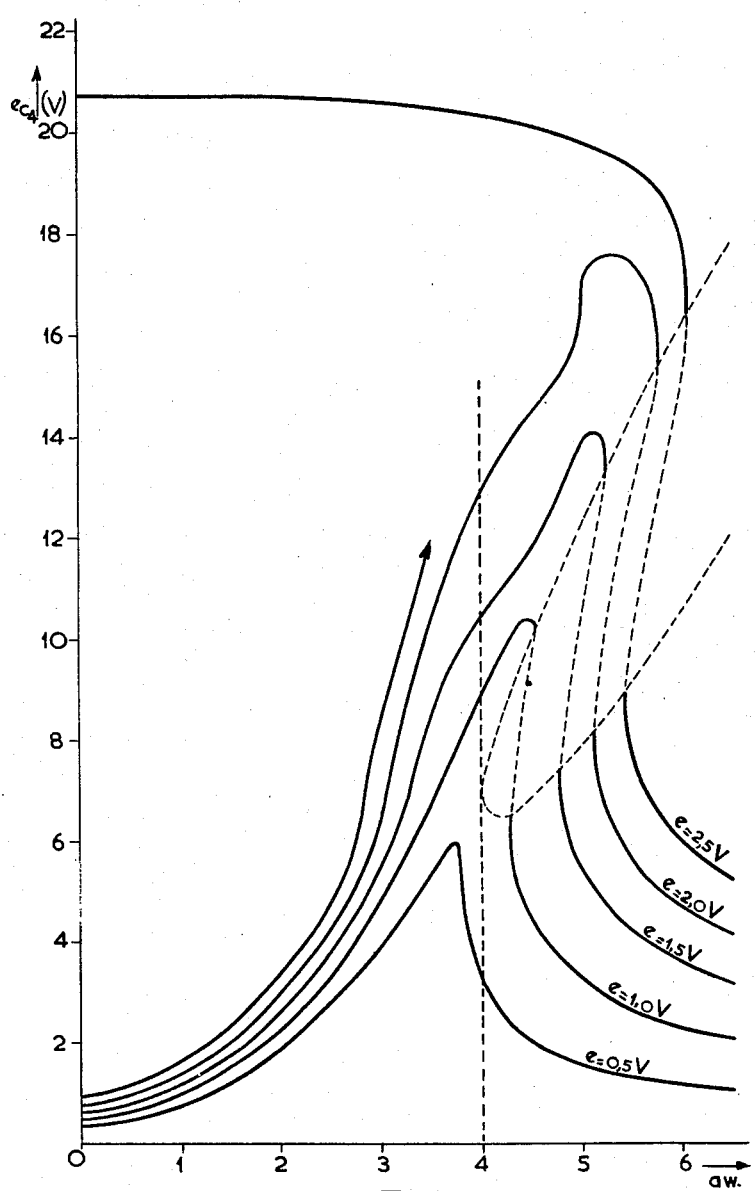
FIG 7 shows a curve which serves to explain the operation of the embodiment shown in FIG. 6.

FIG. 7 shows the effective value of the voltage $e_c$ at the terminals of a capacitor, connected as the capacitor 4 of FIG. 6, as a function of the current through a premagnetizing winding, such as the winding 23, with the effective value of the voltage $e$ at the terminals of a generator, such as the generator 5, as a parameter. The curves shown in FIG. 7 have an unstable portion (the right-hand portion shown in dotted lines), whereas their rising branches exhibit a peculiar hump. It has been found empirically that this hump corresponds to the spontaneous occurrence of subharmonic field components of a higher order dependent upon the choice of the operating-point. The curves of FIG. 7 have been observed at a generator frequency of 20 kc./s., the capacitor 4 having a value of 0.036 μf. and the core 1, 1' consisting of Ferroxcube IIIA. With a suitable choice of the operating point, for example $e=2$ volts and 4 ampere turns premagnetization, and of the operating conditions, it was possible to ascertain in the magnetic field through the core 1, 1' a subharmonic component of a frequency $p/n$ having an amplitude of at least 80% of the amplitude of the alternating field, it being possible for $n$ to be even or odd and of the order of 20 or even higher. Owing to this unexpected distortion effect due to premagnetization, it is thus readily possible to produce subharmonics of a very high rank, the use of a plate of a material with Hall-effect, with magneto-resistance or Gauss effect, or with other magneto-electric transmission properties effective in only one direction therefore allowing the conversion of the resultant alternating magnetic field into a voltage having a subharmonic frequency of the same rank without reaction upon the magnetic field.

What is claimed is:

1. A device for stepping down the frequency of the voltage produced by a generator comprising, in combination, a generator having a frequency $p$, an inductance comprising a core of ferromagnetic material having a narrow air-gap and an input circuit, said air-gap being included in said input circuit, circuit means for connecting said generator to said input circuit, said circuit means comprising a capacitor, the minimum natural frequency of the circuit including said capacitor and said inductance being at least 1.5 times lower than $p$ and having a maximum value equal to the desired stepped-down frequency, means for substantially isolating the device from a load connected thereto comprising a plate of a material exhibiting unidirectional magneto-electric transmission properties arranged in said air-gap, means for establishing a direct current electrostatic field across said plate having a direction transverse to the direction of the magnetic field set up through said plate by the current in said input circuit, and a first pair of electrodes arranged on opposite sides of said plate and coupled to output terminals of the device, whereby a variation in the magnetic field through the plate produces a corresponding voltage variation between said first pair of electrodes, said voltage variation being at the desired stepped-down frequency, the magnetic field through the air-gap being independent of any load connected to said output terminals.

2. A device as claimed in claim 1, said core of said inductance being saturated, so that the inductance constitutes a non-linear element in the input circuit of the device.

3. A device as claimed in claim 2, further comprising means for producing a polarising magnetic induction in the magnetic circuit of said core.

4. A device as claimed in claim 1 said plate exhibiting a Hall-effect in any magnetic field occurring through said core and further comprising a second pair of electrodes connected to a current source, the direction from the one to the other of said second pair of electrodes being transverse to the direction of the magnetic field and to the direction from the one to the other of the first pair of electrodes.

5. A device as claimed in claim 3, said core comprising a material having a substantially rectangular hysteresis loop.

6. A device as claimed in claim 5, characterized in that said core consists of ferrite.

7. A device as claimed in claim 1, said plate having a magneto-resistance effect in any magnetic field occurring through said core, and further comprising means for supplying an energizing current to said first pair of electrodes.

8. A device as claimed in claim 7, characterized in that said core has a high permeability.

9. A device as claimed in claim 7, said plate being included in a bridge circuit, said energizing current being supplied to one of the diagonals of said bridge and an output voltage of stepped-down frequency being produced across the other diagonal.

10. A device as claimed in claim 1, wherein said input circuit coupled to the magnetic circuit of said core includes means having an effective natural frequency substantially equal to that of a desired subharmonic, whereby the occurrence of said subharmonic is favored.

11. A device as claimed in claim 3 in which said polarising means comprises a winding arranged on said core, and further comprising a capacitor connected to said winding together with which it constitutes a circuit coupled to the magnetic circuit of said core and having an effective natural frequency substantially equal to that of a desired subharmonic, whereby the occurrence of said subharmonic is favored.

12. A device for providing an output signal having a frequency which is a submultiple of the frequency $p$ of an applied sinusoidal signal comprising: a source of said sinusoidal signal, an inductance comprising a core of ferromagnetic material having a narrow air-gap and winding means associated with said core, circuit means for connecting said source to said inductance, said circuit means comprising a capacitor, the minimum natural frequency of the circuit including said capacitor and said inductance being at least 1.5 times lower than $p$ and having a maximum value equal to the desired submultiple, means for substantially isolating the device from a load connected thereto comprising a plate of a material having a single conductivity type and exhibiting unidirectional magneto-electric transmission properties arranged in said air-gap, means for establishing a direct current electrostatic field across said plate having a direction transverse to the direction of the magnetic field set up through said plate by the current in said input circuit, a first pair of electrodes arranged in non-rectifying contact with said plate on opposite sides thereof, a pair of output terminals connected to said first pair of electrodes for deriving said output signal at said submultiple frequency, whereby a variation in the magnetic field through the plate produces a corresponding voltage variation between said first pair of electrodes while the magnetic field through the air-gap is independent of any load connected to said output terminals.

13. A device for stepping down the frequency of the voltage produced by a generator comprising, in combination, a generator having a frequency $p$, an inductance comprising a core of ferro-magnetic material having a narrow air-gap and an input circuit, said air-gap being included in said input circuit, circuit means for connecting said generator to said input circuit, said circuit means comprising a capacitor, the minimum natural frequency of the circuit including said capacitor and said inductance being at least 1.5 times lower than $p$ and having a maximum value equal to the desired stepped-down frequency, means for substantially isolating the device from a load connected thereto comprising a plate of a material exhibiting unidirectional magneto-electric transmission properties arranged in said air-gap, means for establishing a direct current electrostatic field across said plate having a direction transverse to the direction of the magnetic field set up through said plate by the current in said input circuit, said inductance and capacitor being connected in series with the generator, the generator having a low internal resistance, and a first pair of electrodes arranged on opposite sides of said plate and coupled to output terminals of the device, whereby a variation in the magnetic field through the plate produces a corresponding voltage variation between said first pair of electrodes, said voltage variation being at the desired stepped-down frequency, the magnetic field through the air-gap being independent of any load connected to said output terminals.

14. A device for stepping down the frequency of the voltage produced by a generator comprising, in combination, a generator having a frequency $p$, an inductance comprising a core of ferro-magnetic material having a narrow air-gap and an input circuit, said air-gap being included in said input circuit, circuit means for connecting said generator to said input circuit, said circuit means comprising a capacitor, the minimum natural frequency of the circut including said capacitor and said inductance being at least 1.5 times lower than $p$ and having a maximum value equal to the desired stepped-down frequency, means for substantially isolating the device from a load connected thereto comprising a plate of a material exhibiting unidirectional magneto-electric transmission properties arranged in said air-gap, means for establishing a direct current electrostatic field across said plate having a direction transverse to the direction of the magnetic field setup through said plate by the current in said input circuit, said inductance and capacitor being connected parallel to the generator, the generator having a high internal resistance, and a first pair of electrodes arranged on opposite sides of said plate and coupled to output terminals of the device, whereby a variation in the magnetic field through the plate produces a corresponding voltage variation between said first pair of electrodes, said voltage variation being at the desired stepped-down frequency, the magnetic field through the air-gap being independent of any load connected to said output terminals.

References Cited in the file of this patent

UNITED STATES PATENTS

| | | |
|---|---|---|
| 2,461,992 | McCreary | Feb. 15, 1949 |
| 2,462,322 | Huge | Feb. 22, 1949 |
| 2,463,540 | Huge | Mar. 8, 1949 |
| 2,649,574 | Mason | Aug. 18, 1953 |
| 2,659,043 | Taylor | Nov. 10, 1953 |
| 2,736,822 | Dunlap | Feb. 28, 1956 |
| 2,830,251 | Tiley | Apr. 8, 1958 |